United States Patent [19]

Wessling

[11] Patent Number: 5,055,922
[45] Date of Patent: Oct. 8, 1991

[54] COLOR TV PROJECTION LENS SYSTEM
[75] Inventor: Richard J. Wessling, Milford, Ohio
[73] Assignee: U.S. Precision Lens Incorporated, Cincinnati, Ohio
[21] Appl. No.: 490,050
[22] Filed: Mar. 7, 1990
[51] Int. Cl.⁵ .................. H04N 9/16; H04N 9/18; H04N 5/740
[52] U.S. Cl. ...................... 358/60; 358/231; 358/64; 358/252; 358/253; 313/478; 313/474; 359/708; 359/722; 359/589
[58] Field of Search ............... 358/60, 231, 236, 239, 358/238, 61, 62, 63, 237, 64, 253; 350/432, 438, 412, 408, 164, 165, 166, 167, 172, 642; 313/478, 474, 477

[56] References Cited

U.S. PATENT DOCUMENTS

| | | | |
|---|---|---|---|
| 2,017,190 | 10/1935 | Waide | 88/16.4 |
| 2,336,134 | 5/1942 | Szegmo | 178/5.4 |
| 2,337,980 | 12/1943 | Dumont | 178/5.4 |
| 2,385,770 | 10/1945 | Birch-Field | 88/24 |
| 2,515,862 | 7/1950 | Carlton | 88/24 |
| 2,586,558 | 2/1952 | Oakhill | 178/5.2 |
| 2,638,499 | 5/1990 | Evans | 179/5.4 |
| 2,654,854 | 10/1953 | Seright | 315/26 |
| 2,669,900 | 2/1954 | Cherry | 88/24 |
| 2,747,460 | 5/1956 | Calvi | 350/60 |
| 4,101,200 | 7/1978 | Daxinger | 358/166 |
| 4,300,187 | 11/1981 | Fletcher | 362/223 |
| 4,454,535 | 6/1984 | Machida | 358/60 |
| 4,526,442 | 7/1985 | Betensky et al. | 350/412 |
| 4,679,069 | 7/1987 | Andrea | 358/60 |
| 4,729,031 | 3/1988 | Saito et al. | 358/60 |
| 4,766,498 | 8/1988 | Spruitt | 358/237 |
| 4,804,884 | 2/1989 | Vriens et al. | 358/237 |
| 4,806,583 | 2/1989 | Battaglia | 313/348 |
| 4,807,014 | 2/1989 | Van Gorkum et al. | 358/65 |
| 4,838,670 | 6/1989 | Ueda et al. | 350/432 |
| 4,933,599 | 6/1990 | Fukuda | 358/237 |
| 4,937,661 | 6/1990 | Van der Voort | 358/60 |
| 4,948,237 | 8/1990 | Hirata et al. | 358/432 |
| 4,987,483 | 1/1991 | Tsukagoshi | 358/237 |

FOREIGN PATENT DOCUMENTS

| | | |
|---|---|---|
| 2315920 | 10/1974 | Fed. Rep. of Germany . |
| 262819 | 7/1987 | Japan . |
| 65401 | 5/1988 | Japan . |
| 254087 | 11/1989 | Japan . |

OTHER PUBLICATIONS

The Handbook of Plastic Optics, Second Edition, 1983, pp. 15, 21 and 22.
Mitsubishi Catalog: Mitsubishi Projection TV Z1.
Hitachi Catalog: 42 inch Projection TV.

Primary Examiner—Tommy P. Chin
Assistant Examiner—Michael H. Lee
Attorney, Agent, or Firm—A. L. Michaelsen

[57] ABSTRACT

Disclosed is an improved color projection TV lens system which provides reduced chromatic aberration and improved chromaticity. These improvements are achieved by incorporating a light absorbing material into at least one lens in the system wherein the lens has a substantially uniform thickness.

13 Claims, 6 Drawing Sheets (PRIOR ART)

COLOR TV PROJECTION LENS SYSTEM

FIELD OF THE INVENTION

This invention relates to a TV projection lens system and, more particularly, to such a lens system which provides reduced chromatic aberration, improved color purity and contrast.

BACKGROUND OF THE INVENTION

Large screen projection TV's are well known. Typically, such TV sets contain three CRT's, one for each of the primary colors, namely red, blue and green. A lens system is associated with each CRT. Each lens system magnifies the image appearing on the face plate of the CRT and projects the magnified image on the viewing screen of the projection TV. It is, of course, important from the point of view of the user that the projected image be sharp, i.e. the image should not be "fuzzy", and the image should be bright and have natural appearing color and contrast. The history of the design of color TV projection lens systems reflects ongoing efforts to achieve these objectives while, at the same time, endeavoring to avoid undue complexity and cost in the design of the lens system.

The achievement of these objectives has been difficult. Perhaps the best evidence of that difficulty is the fact that room for improvement still exists, notwithstanding the fact those skilled in this art have been working on these matters for more than about 35 years. Some of the difficulties which have impeded progress can be understood by considering the complexities of such a system. For example, the CRT's commonly used in projection TV's have a raster with a diameter of about 5 inches. Commonly, the viewing screen of a projection TV is in the range of 40 to 50 inches. Thus, a remarkably high performance is demanded from a projection TV lens system because the system must not only magnify an image by a factor of more than 8 but, in addition, it must do so while preserving the image quality. Additionally, this performance must be obtained within the confines of the projection cabinet which ideally should be as small as possible. And, once again, the lens system itself should not be unduly complex because, otherwise, the cost of the resulting TV set may become prohibitively high.

Considering such systems in more detail, three CRT's typically have been used in an effort to achieve a bright and sharp projected color image. Specifically, the use of three CRT's, each of which produced a specific color, resulted in a brighter image by allowing the elimination of the color mask needed in single CRT's which produce a full range of colors. The earliest projection TV sets used Schmidt type lens systems that were nearly color corrected. At that time, color was not a problem.

As the art developed, refracting lens systems were introduced and the monochromatic aspects of the three CRT's were exploited, which initially enabled the use of non-color corrected lenses. Thereafter, a demand arose for projection TV's which could be viewed in normally lighted rooms, as opposed to the partially lighted or darkened rooms in which projection TV's were initially used. Also, so-called rear projection TV sets were then introduced which were aimed at usage in normally lighted rooms. As a result, there was an ever increasing desire for a brighter image. This desire was accommodated by improvements in the CRT design. However, as a consequence of the these "improvements" the resulting CRT's and especially the "green" CRT's, i.e. those which produced nominally green light, produced light of other wavelengths. Consequently, the non-color corrected aspects of the projection lens system became a problem because of the resulting chromatic aberration and color correction of the lenses was needed to produce sharper, clearer pictures having acceptable contrast. Such color correction increased the cost and complexity of the lens system.

The problem of chromatic aberration was recognized very early in this art. In fact, the art reflects that at about the dawn of the age of television, some workers in the art had some awareness of this problem. This awareness is reflected in U.S. Pat. No. 2,336,134, which refers to the desirability of using particular materials to correct for "chromatic error". Notwithstanding this early awareness, when color projection TV initially became a reality, those skilled in the art did not pay particular attention to the problems which are caused by chromatic aberration. Thus, early designs of projection TV lens systems did not reflect a concern about the need for color correction. Examples of such early designs of lens systems are seen in U.S. Pat. Nos. 4,300,187 and 4,526,442. However, as progress in the art occurred and systems were improved, concern arose with respect to the need for "color correction", i.e. the need, within the lens systems, to correct for chromatic aberration caused by the lack of color "purity" in the output of the individual CRT's.

Considering the approaches to solving this problem which are evidenced by the prior art, most are centered around the use of ever more elaborate lens systems. Some examples of prior art attempted solutions of the chromatic aberration problem are the use of lenses which have different Abbe numbers. In this regard, U.S. Pat. No. 4,838,670 is illustrative of such attempts to deal with the problem of chromatic aberration. Specifically, in this patent it is pointed out that in supposedly monochromatic CRT's currently used in projection TV's "there occurs a color deviation caused by spectral distribution of fluorescence". In an effort to deal with this problem and thereby provide a truly color corrected or achromatic lens system, the patent teaches that lenses of widely varying Abbe numbers must be used, together with other lenses which must satisfy numerous other optical conditions. Although such lens systems do provide a substantial solution to the problem of chromatic aberration, it will be appreciated that the resulting complexity is highly undesirable, both from a cost and manufacturing point of view, and they do not improve chromaticity.

A different approach to solving this problem, which was tried by at least one prior art worker, sought to utilize the cooling liquid which is typically employed to dissipate the heat generated by the CRT. As is known to those skilled in this art, such liquids are used for the following reasons. In an effort to get an ever brighter picture, CRT's have been operated at increasingly high voltages. However, as a consequence, more heat is generated and therefore must be dissipated in order to avoid damage to the CRT and to improve phosphor life. For some time, the art has achieved this dissipation by enclosing the face of the CRT and filling the enclosure with a liquid, which serves as a heat sink and facilitates dissipation of the heat. The aforementioned prior art worker endeavored to use this liquid to ameliorate the chromatic aberration problem by the mechanism of including a dye in the cooling liquid. Such an approach is shown somewhat schematically in FIG. 1, wherein lens element 40 is the lens closest to the CRT 43 and 46 represents other lenses in the system which, for clarity, are not shown.

Figure 1:
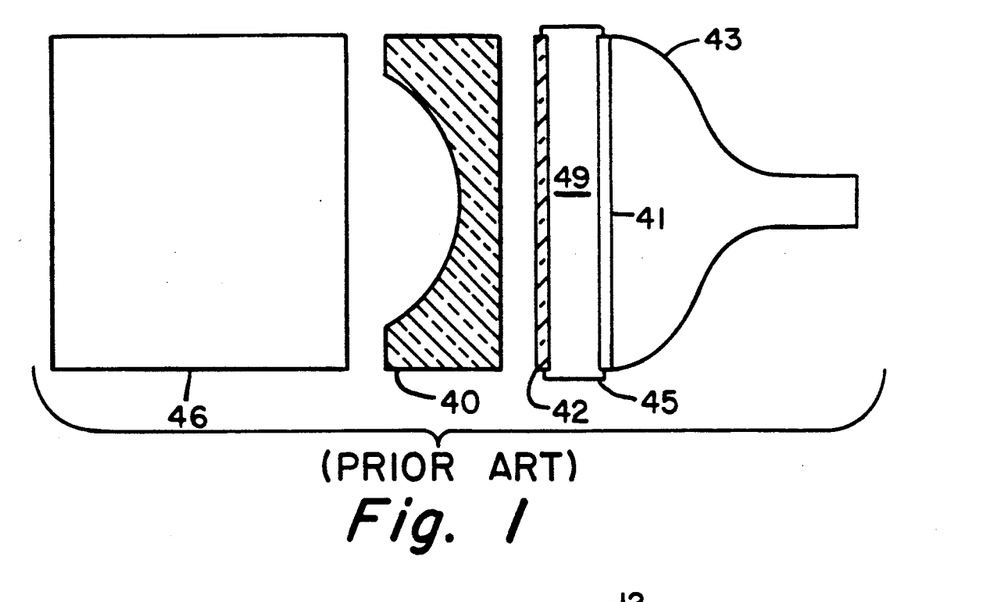
FIG. 1 is a partial schematic representation of a prior art construction.

Referring to FIG. 1, it will be seen that an enclosure is formed by mounting a glass plate 42 in front of the CRT 43 and the space 49 therebetween, defined by the face plate 41, the collar 45, and the plate 42, is filled with a cooling liquid which includes a dye. Several significant problems resulted from this approach, although this approach is still in use today. For example, the need to provide the glass plate 42 increased both the cost and weight of the lens system. Additionally, and perhaps more significantly, the two surfaces of the glass plate inevitably resulted in transmission losses and scattering because of reflections at these surfaces and, consequently, the brightness and contrast of the picture were reduced. Some effort was made to address this problem by providing a seal between the glass plate and the so-called "C" element 40 of the lens system, i.e. the element closest to the CRT, and filling that space with fluid. However, as will be appreciated, this approach further increased the manufacturing cost and the complexity of the lens design.

The prior art recognized the difficulties caused by the provision of such a glass plate and some designs were evolved which eliminated the plate. In these designs, an enclosure was formed with the "C" element 40 in the front and the CRT in the rear and this enclosure was then filled with a liquid. Typically, this liquid was transparent, i.e. a dye was not added to the liquid. A problem associated with any contemplated addition of a dye to the liquid of such a construction was the fact that the surface or face plate 41 of the CRT 43 generally is concave rather than being flat. Thus, if a dye had been added to the liquid, the light emitted from the CRT would have been attenuated as a function of the radial distance from the center of the CRT. It was thought that such a result would only exacerbate the ever present problem of reduced corner illumination on the screen of the projection TV.

Another recent prior art endeavor to address these problems is reflected in U.S. Pat. No. 4,679,069. This patent includes an exposition of the fact that light emitted from present CRT's is impure, i.e. such light contains undesirable sidebands. In an effort to address this problem, this patent teaches the use of wavelength-selective reflectors which preferably are in the form of dichroic mirrors. Although such devices are in use, there are numerous disadvantages which attend this approach. For example, such mirrors are expensive. (The mirror shown in said patent has ten alternating layers of silica and titania.) Additionally, the filter effect of a dichroic mirror varies as a function of the angle of the incident light. Thus, notwithstanding the expense of this approach, there is an inevitable variation in the picture as a function of the position on the screen. Also, dichroic mirrors reflect light, which reduces contrast significantly.

SUMMARY OF THE INVENTION

Contrary to the direction reflected by the prior art relating to TV projection lens systems, my invention provides a significantly improved but simple projection lens system which has less chromatic aberration and higher color purity. Because of its simplicity, my invention may be advantageously employed in a projection TV to achieve selective color filtering, although all of the three basic colors may also be filtered. These objectives are realized by incorporating a light absorbing material in at least one of the lenses of a projection TV lens system, whereby the lens also acts as a color or bandpass filter. The filter material is incorporated in a lens element which has a substantially constant thickness.

Several desirable benefits accrue from this desirably simple approach. First, color purity is increased without a reduction in contrast. Second, increased sharpness of the image results from filtering some of the sidebands of light.

DETAILED DESCRIPTION OF PREFERRED EMBODIMENTS

Figure 2:
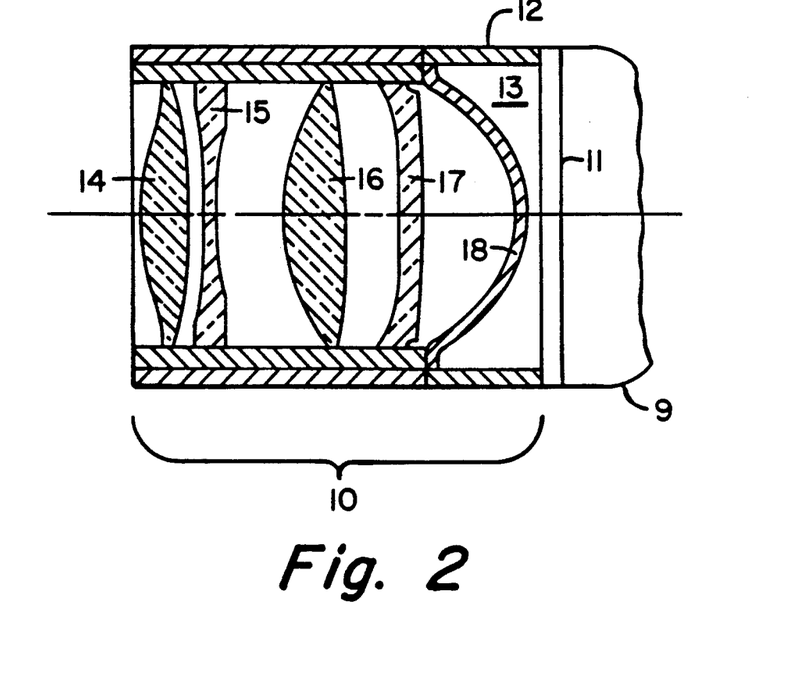
FIG. 2 is a side view, in cross section, of a presently preferred embodiment of my invention.

FIG. 2 shows a type of projection lens system which may usefully embody my invention. The projection lens system, which is generally indicated as 10, is, when used, affixed by appropriate means 12 to a CRT 9. The means 12 for affixing the lens system to the CRT defines an enclosure 13 which contains an optical coupling liquid.

The lens system 10 is of a type which is referred to as partially color corrected. It is comprised, from the image side, of five elements, 14–18. The function of these elements is generally well known to those skilled in this art and will only briefly be described because the specific elements used in any particularly lens system is not critical to the practice of my invention.

Lens element 14 is of low power and both of its surfaces are aspheric. The primary function of this element is to correct for aperture dependent aberrations. In the design shown in FIG. 2, element 14 would be made from an acrylic plastic.

Lens element 15 is, as shown, a double concave lens and preferably will be made from a polystyrene plastic. This lens element, together with element 14, provides partial color correction.

Lens element 16 is the so-called power element in the system, i.e. it provides substantially all of the optical power of the system. To assist in performing this function, it is desirably made of glass.

Lens element 17 is a so-called corrector element and is desirably made of an acrylic plastic. Its function is to assist in the correction of aberrations other than chromatic aberration. Like element 14, both its surfaces are aspheric and its power is weak.

Lens element 18 is a so-called field flattener, of the type used with a liquid or index matching coupling to the CRT, and may be made from an acrylic plastic.

For purposes of illustration and because it represents the preferred embodiment of my invention, the embodiment of FIG. 2 will be described assuming that the CRT 9 is a green CRT. In accordance with my invention, when the material from which element 18 is formed, there is incorporated therein an absorptive color filter material. Thus, in this particular example, wherein it is assumed that the CRT 9 is a green CRT, the filter material incorporated within the acrylic material of lens 18 serves as a bandpass filter, i.e. it has a high transmission of light in the green wavelength (about 550 nanometers), and the transmission falls off sharply for light of shorter and longer wavelengths.

In further accordance with the preferred embodiment of my invention and as shown in FIG. 2, I ensure that the thickness of the element containing the filter material is substantially constant. Thus, referring to FIG. 2, it will be seen that element 18 has a substantially uniform thickness. By "substantially uniform thickness" I mean that the ratio (R) of the thinnest part of the lens to the thickest part is in the range of $0.2 < R \leq 1.0$ and preferably in the range of $0.34 \leq 1.0$. Additionally, it is preferred to include an anti-reflective coating (not shown) on the screen side surface of the lens 18. When a liquid coupling 13 is to be employed, as contemplated by the construction of FIG. 2, an anti-reflective coating is not required on the CRT side of lens 18.

The advantages which attend the practice of my invention can best be appreciated by considering the performance of the lens system shown in FIG. 2, the problems which are avoided by the invention, and the simplicity of the resulting construction.

The significance of the problems which are avoided is best appreciated by considering the problems inherent in prior art attempts to use absorptive color filters. Considering, for example, U.S. Pat. No. 2,669,900, shown therein is a color television projection system wherein three CRT's are provided (red, green and blue), together with projection lenses. Interposed between each CRT and its associated lens is a color filter. Although in such a system color filtering action is obtained, a considerable price is paid because of reflections which occur from each of the surfaces of the filters. Not only do these reflections reduce the brightness of the projected light but, in addition, further undesirable results occur. Specifically, the reflected light is reflected back into the lens assembly and the face plate of the CRT which causes misdirected re-radiation which reduces picture contrast. Although this highly undesirable effect could be reduced by the use of anti-reflective coatings on the filter plates, the consequence would an increase in the cost of the system and, in any event, there would still be the signal attenuation which would occur by virtue of the light having to pass through a separate element. It is perhaps, for all of these reasons that such color filters have never been used in commercial color projection TV's.

In contrast, all of the aforementioned reflection problems are avoided through the practice of my invention because the color filter material is incorporated within a lens element, rather than as a separate element and does not filter by reflection. (By the use of the words "lens", I mean an element which performs an optical function, separate and apart from any filtering action.) In addition, although there is some light attenuation which occurs even with the practice of my invention, it is less than that which occurred with prior art constructions of the type described above. This desirable result is achieved because, in a system employing my invention, there is not a separate piece of material through which the light must travel. Consequently, as described hereinafter, it has been surprisingly found that, to the extent that attenuation does occur because of the presence of the filter material, it is wholly acceptable, especially in view of the other manifest performance improvements which are realized.

Considering the performance of a lens system embodying my invention, both quantitative and qualitative improvements have been realized which have surprised those skilled in this art. Specifically, it has been found that, by using a lens system embodying my invention, a much sharper image is formed and contrast is improved. Indeed, it has been found that, if my invention is incorporated in a so-called partially color corrected lens system, performance is achieved which is substantially the same as that achieved using a so-called fully corrected (and more expensive) lens.

Finally, as indicated above and as may be seen from a consideration of FIG. 2, the use of my invention results in a lens system design which is far simpler than prior art designs which provided the same performance in terms of image sharpness and contrast. And, of course, if my invention is incorporated in a fully color corrected lens system, the performance of color purity is thereby enhanced.

Another significant aspect of my invention is that it allows selective utilization. By "selective utilization" I mean the following. The problem of broadband radiance is particularly severe with respect to light emitted from green CRT's. There are many reasons for this phenomenon, including the nature of presently available green phosphors, the fact that the color green is somewhat in the middle of the visible spectrum, and the manner in which the eye perceives colors.

Briefly considering some of these problems, which are well-known to those skilled in this art, the nature of presently available phosphors is such that the strongest phosphors are the green phosphors and blue phosphors are the weakest. Red is in between green and blue. (By "strongest" I mean that, for example with respect to green phosphors, the light emitted from such phosphors is of a greater intensity than that which is emitted from red or blue phosphors.) However, the light emitted from green phosphors is the least "pure", in terms of having more sidebands of other wavelengths. This is significant because the eye is generally more sensitive to the color green, as compared to other colors. Thus, the "contamination" of the light emitted from green phosphors is particularly troublesome and noticeable. This is manifested as poor color purity.

An allied problem, which is basically one of chromatic aberration, is lack of sharpness in the picture. This arises with the light from green phosphors because the adjacent "blue" wavelengths, which are also emitted from the "green" phosphor, will focus in front of the screen and the adjacent "red" wavelengths which are also emitted by the "green" phosphor, will focus beyond the screen, assuming that that lens system focuses the green wavelengths on the screen. Consequently, the image component from the green CRT will be in focus only for the green wavelength, but out of focus for the blue and red wavelengths which will result in an image with a bluish red halo around a green image if the lens system is not fully color corrected.

Interestingly, the same problems occur to a much lesser degree, with respect to the light emitted from red and blue phosphors. This is because, as indicated above, light emitted from red or blue phosphors is more pure, i.e. has fewer sidebands, as compared to light from green phosphors.

As a consequence of all these phenomena, I have found that my invention can be very advantageously employed by applying it only to the lens system associated with a green CRT and using corresponding lens systems, but without the benefit of any filtering function, with the blue and red CRT's. This is a most desirable approach because it results in the overall use of a less sophisticated lens system, e.g. an overall system where all the lens systems may be only partially color corrected and only one of the lens systems includes a filtering means.

Although, as described above, my invention may be preferentially used, e.g. only in the lens system which is associated with the "green" CRT, it is within the ambit of my invention to use it in two or all of the lens systems in a projection TV. Thus, my invention may be used within the lens systems associated with the red and/or the blue CRT's, as well as the green CRT.

Figure 3:
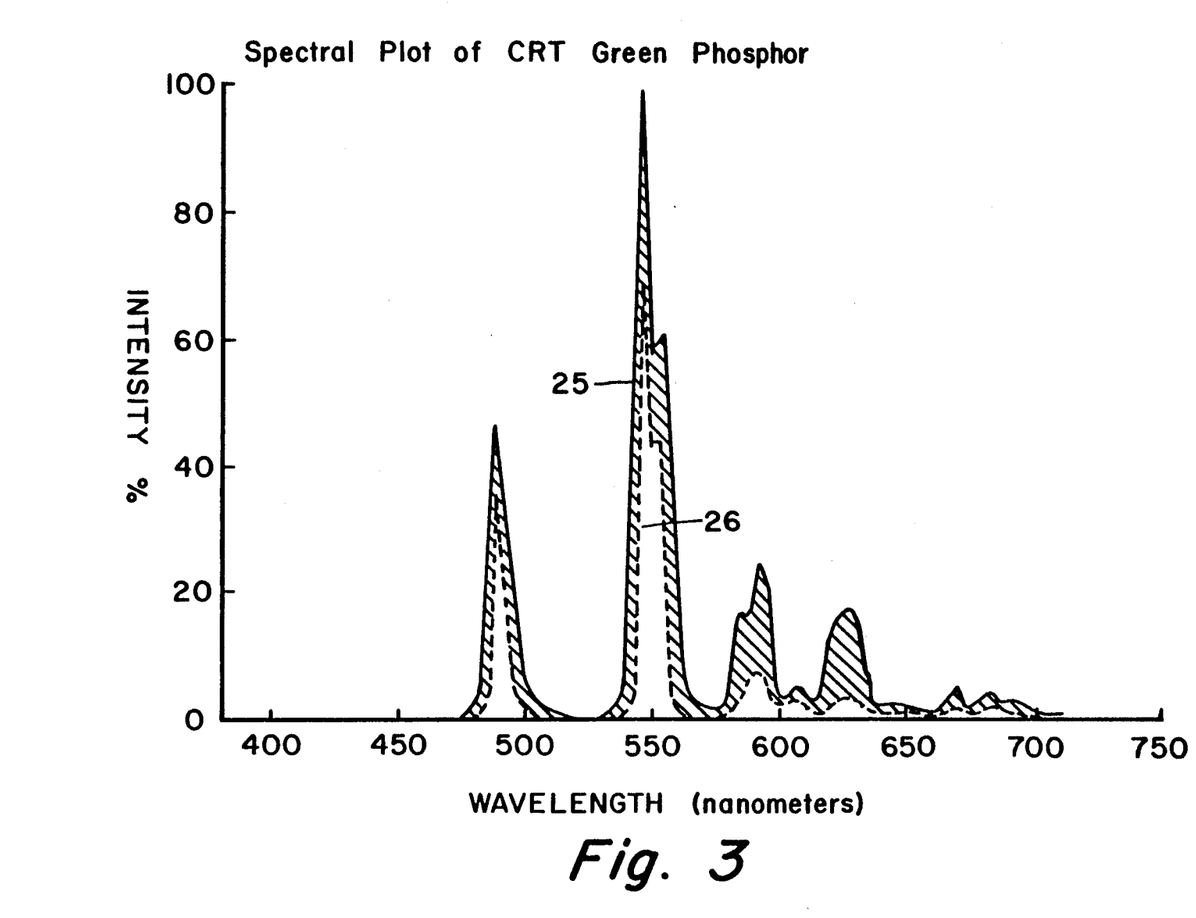
FIG. 3 is a spectral plot of intensity versus wavelength for a typical green phosphor used in a CRT.
Figure 4:
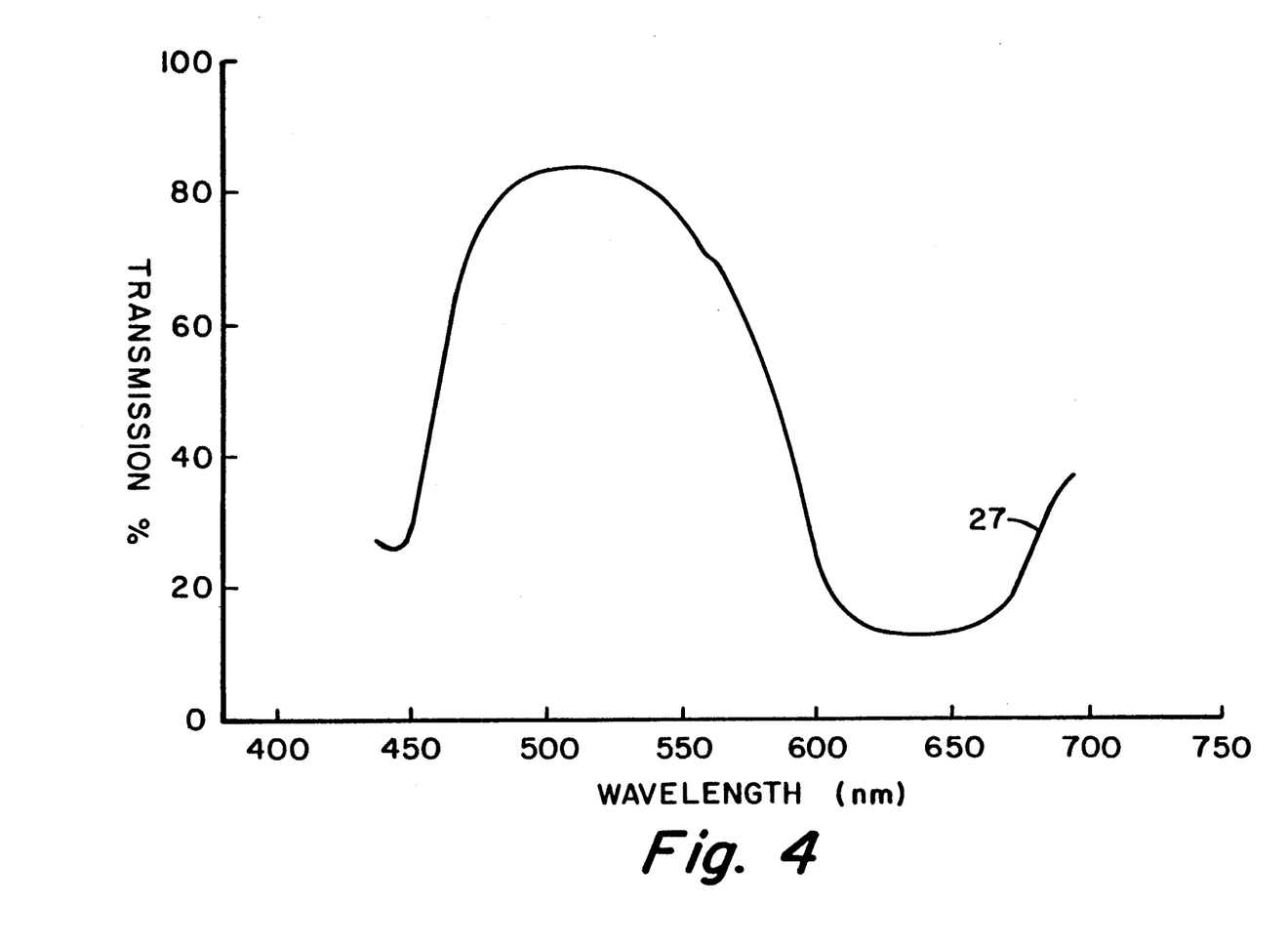
FIG. 4 is a spectral plot of transmission versus wavelength for a filter material useable in my invention.

Another consequence of these phenomena relates to the type of filtering material which may be employed. The solid line 25 in FIG. 3 is a spectral plot of the output of a typical "green" phosphor which, if it performed ideally, would emit light only at a wavelength of 550 nanometers. As shown in FIG. 3, however, there is considerable light emitted at both longer and shorter wavelengths. Also shown in FIG. 3 is a broken line 26 and the areas between the lines 25 and 26 are shaded. The broken line 26 represents the spectral plot of the light which results after it passes through a lens element, e.g. the lens element 18 in FIG. 2, which contains an absorptive color filter material. In other words, if light having the spectral plot shown by the line 25 is put through such a lens element, the output light will have a spectral plot shown by the curve 26 and the shaded areas represent the portions of the incident light which is filtered by the filter material. The curve 27 shown in FIG. 4 is the transmission spectrum of a filter material which provides the filtering action shown in FIG. 3. Of course, the extent of the filtering action is dependent upon the thickness of the lens element in which the filter material is employed and the concentration of the filter material. Selection of an appropriate concentration of filter material will be made by the skilled art worker and will necessarily take into account such factors as the thickness of the lens and the extent to which the overall power of the signal may be attenuated.

Figure 5:
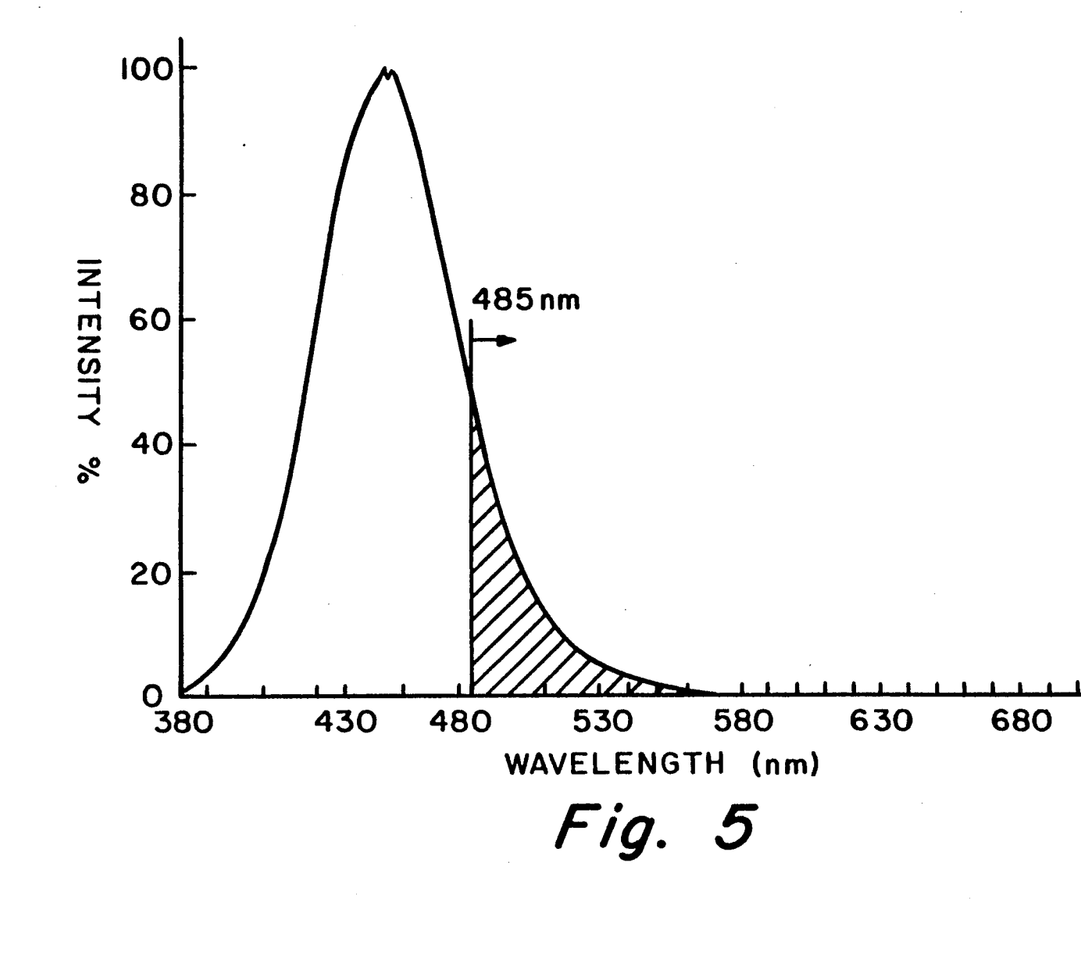
FIG. 5 is a spectral plot of transmission versus wavelength for a typical blue phosphor used in a CRT.

Referring to FIG. 5, it will be seen that the transmission curve 27 of the filter material is not symmetric, but is asymmetric about the desired wavelength of 550 nanometers. Thus, such a filter material provides more filtering at wavelengths greater than 550 nanometers than below 550 nanometers. This is manifested in FIG. 3 wherein it will be noted that the filtering action, i.e. the shaded portions, are greater for the wavelengths greater than 550 nanometers. Although it would, of course, be ideal to use a filter material which had a transmission curve in the shape of a narrow step function, I have found that a material having a transmission curve of the type shown in FIG. 4 can be advantageously used, i.e. a material which filters more at wavelengths longer than the desired "green" and relatively less for wavelengths shorter than the desired "green" wavelength.

This advantageous effect apparently arises because the human eye is more sensitive to colors in the "red" wavelengths than in the blue or shorter wavelengths. Thus, it is more important, from the point of view of perception, to filter out the longer wavelengths. The resulting ability to use a filter material which does not have sharp cutoffs is advantageous because there is a smaller reduction in signal strength. However, if it is desired to realize a tighter or more narrow filtering action, e.g. a shown by the dash lines 28 in FIG. 4, appropriate filtering materials can be included in one of the lenses of the system which has substantially uniform thickness and I have found that increased signal attenuation is quite tolerable as a trade-off for improved picture quality. Indeed, with respect to obtaining such a filtering action, my invention provides particular flexibility. Thus, an essentially "notch" type of filtering action can be achieved by incorporating different filtering materials in different lens elements whereby one element, with its filter material, will act as a filter which filters only the longer wavelengths, and the other lens, with its filter material, will act as a filter which filters only the shorter wavelengths. Thus, the combined action of these two lenses, with their associated filter materials, which achieve a "notch" type filtering action.

Figure 6:
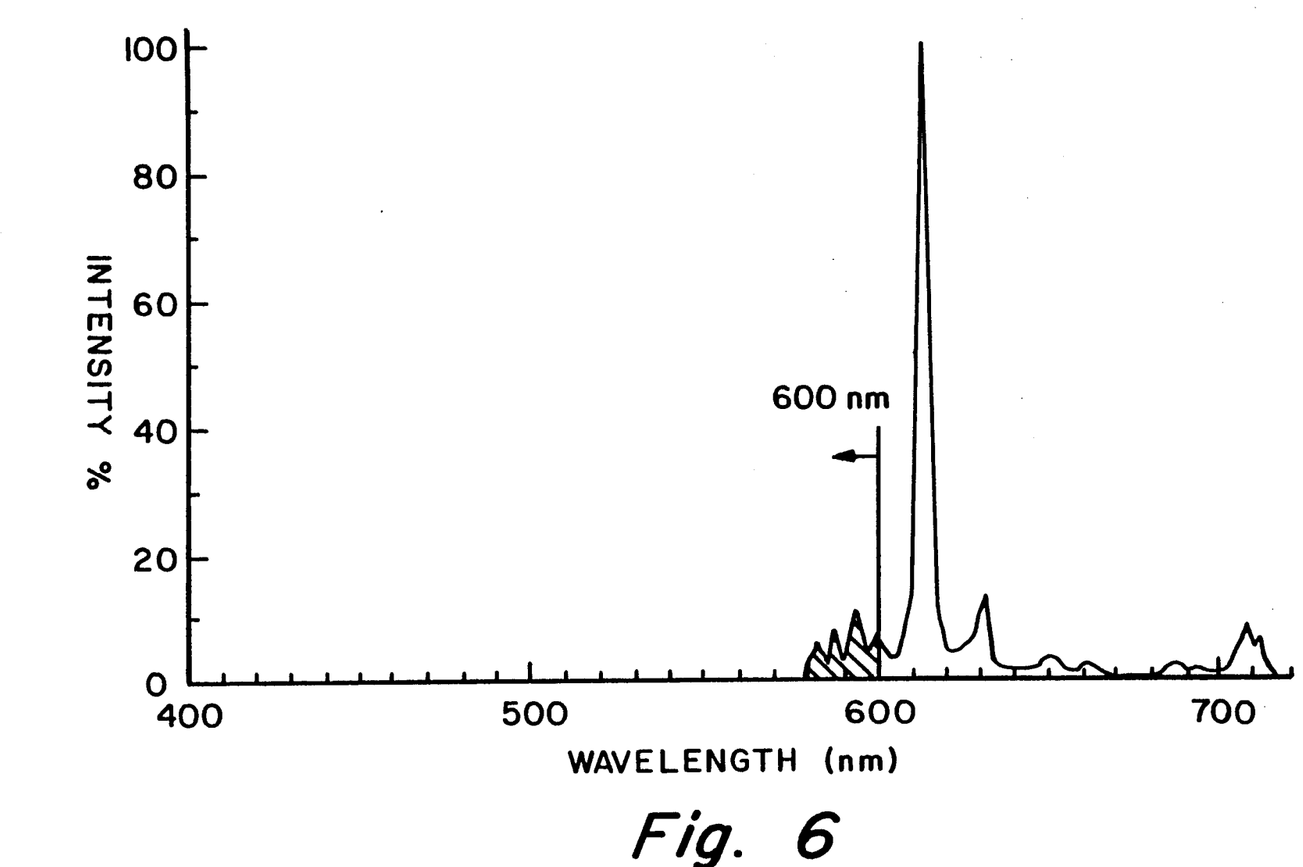
FIG. 6 is a spectral plot of transmission versus wavelength for a typical red phosphor used in a CRT.

FIGS. 5 and 6 show, respectively, the output from typical blue and red phosphors and the filtering which is desired if filters are to be used with the CRT's which produce these colors. Specifically, the shaded areas in each of these figures represent the spectral portion of the output which is desirably attenuated or filtered by incorporating an appropriate absorbing filter material in one or more lenses having substantially uniform thickness.

Although I prefer that the color filter material be included within the lens element which is closest to the CRT, i.e. typically the so-called field flattener (lens element 18 in FIG. 2), my invention can be utilized within another lens which would be located on the screen side of the field flattener, provided that any such lens had substantially uniform thickness. Thus, my invention can profitably be employed by incorporating the color filter material within another lens element of relatively weak optical power, for example a so-called corrector lens which may be positioned between the field flattener and an adjacent biconvex lens.

As previously indicated, my most preferred embodiment is to include the color filter material in the field flattener lens, which should have a substantially uniform thickness, and preferably only a green filter is used, whereby, in a resulting projection TV, the lens systems associated with the blue and red CRT's will not include color filters but the lens systems associated with the green CRT will include a "green" color filter material.

With respect to the filter material per se, it will of course be appreciated that the filter material is to be incorporated into a plastic lens. Although it may be technically possible to provide glass lenses with a desired filter action, the cost of doing so would be almost prohibitively high. Considering the filter material itself, a number of appropriate materials are commercially available, upon request, as components of the plastic, e.g. acrylic, from which lenses of this type are made. Coz Div. of Allied Products Corp., Providence Road, Northbridge, Mass., 01534, is one such supplier. Another supplier is Rohm & Haas Co., Independence Mall West, Philadelphia, Pa., 19105.

Figure 7:
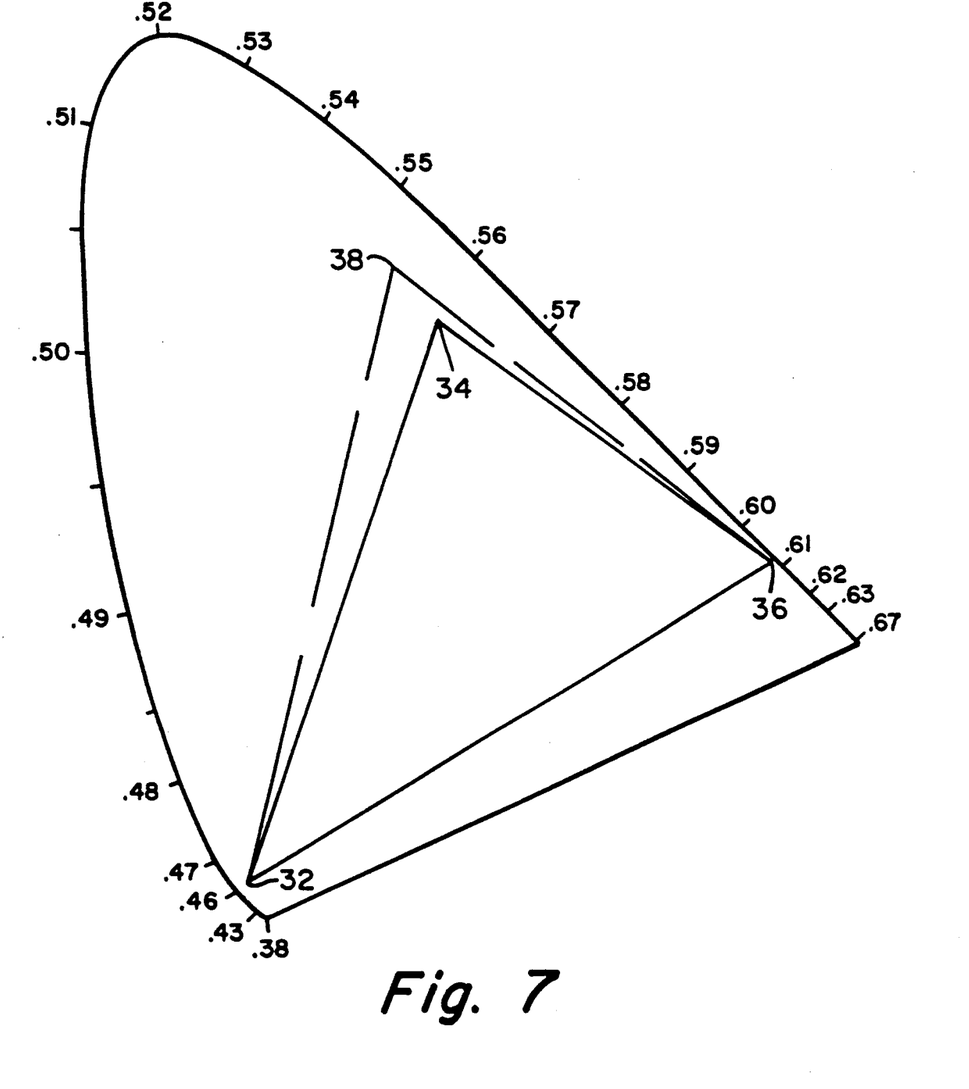
FIG. 7 is a so-called CIE diagram.

The use of my invention provides another significant and desirable benefit, namely improved and more natural color appearing on the screen. Those skilled in this art refer to this general area as chromaticity or an expanded color palette. To graphically display or indicate chromaticity, skilled art workers use a so-called CIE chart, an example of which is shown in FIG. 7. Referring to FIG. 7, the numbers appearing around the boundary of the chart represent wavelengths, in microns. The desired blue color would be represented by a point on the boundary of the chart, at the lower left, at a wave-length of about 0.45. The desired red would be represented by a point on the boundary of the chart, at the lower right, at a wavelength of about 0.61 microns. Similarly, the desired green would be represented by a point on the boundary of the chart at a wavelength of about 0.545 microns.

Shown within the CIE chart of FIG. 7 is a triangle defined by the apexes 32, 34 and 36. Each apex represents the color emitted from one of these CRT's. Thus, apex 32 represents the color from the blue CRT, apex 34 represents the color from the "green" CRT and apex 36 represents the color from the "red" CRT. As may be seen from the chart, the apex 34 is, in fact, quite distant from the point on the chart which would represent a "pure" green. Thus, this is graphical illustration of the previously described lack of "purity" in the "green" light emitted from present "green" phosphors. To the eye of the viewer, this is manifested by a "green" color which is more yellowish green, than a pure green.

From the point of view of the lens or set designer, the area within the triangle defines the color "palette", i.e. the total range of colors which may displayed on the set. Thus, it is the objective of the lens and set designer to increase the size of this triangle because, then, a greater range of colors are available and the colors presented will be more natural. The use of my invention provides the ability to take significant steps in this direction. Specifically, considering the graphical representation of FIG. 7 and the use of my invention in the lens system associated with the "green" CRT, the resulting light emanating from the lens system will be represented by point 38. If a new triangle is then drawn using the apexes 32, 38 and 36, it will be seen that the area of that triangle is greater. Consequently, the color palette is increased, and to the viewer, the colors which appear on the screen are more natural and pleasing. Similar results, in terms of increasing the color palette or triangle, will of course be obtained by using my invention in the lens systems associated with the red and blue CRT's, although the results will not be as dramatic because, as shown in FIG. 7, the "red" and "blue" colors are already near their most desirable or purest points.

Although preferred and other embodiments of my invention have hereinbefore been described, other embodiments may be perceived by those skilled in the art without nevertheless departing from the scope of my invention as defined by the following claims.

We claim:

1. A projection television lens system which, when used, provides reduced chromatic aberration and improved chromaticity and which comprises a plurality of solid lenses wherein at least one of said lenses has a substantially uniform thickness and said lens includes, as an integral part thereof, an absorptive color filter material which is dispersed substantially throughout said lens and substantially absorbs at least certain wavelengths of light other than the wavelength of light desired from a CRT with which said lens is or will be associated.

2. The lens system of claim 1 wherein said color filter material substantially absorbs at least certain wavelengths of light which are not in the green wavelength of about 550 nanometers.

3. The lens system of claim 1 wherein said at least one lens is a meniscus which is concave to the screen side of the lens system.

4. The lens system of claim 3 wherein said meniscus lens is the lens closest to the end of the system which will be attached to the CRT.

5. The lens system of claim 4 wherein the remainder of the lens system is designed to achieve at least partial color correction of the transmitted light.

6. The lens system of claim 4 wherein said meniscus lens further includes an anti-reflective coating on the screen side of said meniscus lens and said lens system is adapted to be liquid coupled to the CRT.

7. The lens system of claim 1 which further includes a field flattener lens adapted to be mounted adjacent the CRT and said at least one lens is located on the screen side of said field flattener lens.

8. The lens system of claim 3 or claim 7 wherein the remainder of the lens system is designed to achieve no substantial color correction of the transmitted light.

9. The lens system of claim 3 or claim 7 wherein said color filter material has a spectral transmission curve which is asymmetric about the desired wavelength.

10. The lens system of claim 3 or claim 7 wherein said color filter material has a spectral transmission curve which is symmetric about the desired wavelength.

11. The lens system of claim 7 wherein said at least one lens includes an anti-reflective coating on both surfaces of said lens.

12. A color projection television set which comprises three CRT's which respectively provide images nominally having the colors blue, red and green, three projection lens systems, each of which is paired with a respective CRT and each of which is comprised of a plurality of solid lenses, wherein at least the lens system associated with the green CRT includes at least one lens having a substantially constant thickness and which includes as an integral part thereof an absorptive color filter material which is dispersed substantially throughout said lens and substantially filters at least certain wavelengths of light other than the wavelength of light desired from said CRT.

13. The projection television set of claim 12 wherein the lens systems associated with the blue and the green CRT's also each include at least one lens having a substantially uniform thickness and which includes as an integral part thereof an absorptive color filter material which substantially filters at least certain wavelengths of light other than the wavelength of light desired from each of said CRT's.

* * * * *